US012110606B2

(12) United States Patent
Stadler et al.

(10) Patent No.: US 12,110,606 B2
(45) Date of Patent: Oct. 8, 2024

(54) SILVER ELECTROLYTE FOR DEPOSITING DISPERSION SILVER LAYERS AND CONTACT SURFACES WITH DISPERSION SILVER LAYERS

(71) Applicants: Rosenberger Hochfrequenztechnik GmbH & Co. KG, Fridolfing (DE); Dr.-Ing. Max Schlötter GmbH & Co. KG, Geislingen/Steige (DE)

(72) Inventors: Andreas Stadler, Saaldorf-Surheim (DE); Robert Sottor, Frankfurt (DE); Reinhard Wagner, Seekirchen am Wallersee (AT); Christian Dandl, Fridolfing (DE); Sebastian Heitmüller, Deggingen (DE)

(73) Assignees: ROSENBERGER HOCHFREQUENZTECHNIK GMBH & CO. KG, Fridolfing (DE); DR.- ING. MAX SCHLOTTER GMBH & CO. KG, Geislingen/Steige (DE)

( * ) Notice: Subject to any disclaimer, the term of this patent is extended or adjusted under 35 U.S.C. 154(b) by 0 days.

(21) Appl. No.: 17/251,253

(22) PCT Filed: Jun. 26, 2019

(86) PCT No.: PCT/DE2019/100596

§ 371 (c)(1),
(2) Date: Dec. 11, 2020

(87) PCT Pub. No.: WO2020/007407

PCT Pub. Date: Jan. 9, 2020

(65) Prior Publication Data

US 2021/0254230 A1 Aug. 19, 2021

(30) Foreign Application Priority Data

Jul. 5, 2018 (DE) ........................ 102018005352.1

(51) Int. Cl.

| | |
|---|---|
| ***C25D 3/46*** | (2006.01) |
| ***C25D 5/12*** | (2006.01) |
| ***C25D 5/34*** | (2006.01) |
| ***C25D 7/00*** | (2006.01) |
| ***C25D 7/06*** | (2006.01) |
| ***C25D 15/00*** | (2006.01) |
| ***C25D 17/08*** | (2006.01) |
| ***H01R 13/03*** | (2006.01) |

(52) U.S. Cl.

CPC ................. *C25D 3/46* (2013.01); *C25D 5/12* (2013.01); *C25D 5/34* (2013.01); *C25D 7/00* (2013.01); *C25D 7/0614* (2013.01); *C25D 15/00* (2013.01); *C25D 17/08* (2013.01); *H01R 13/03* (2013.01)

(58) Field of Classification Search

None

See application file for complete search history.

(56) References Cited

U.S. PATENT DOCUMENTS

| | | | | |
|---|---|---|---|---|
| 2007/0111031 A1* | 5/2007 | Isberg | .................. | H01R 13/035 428/457 |
| 2007/0275611 A1 | 11/2007 | Rehbein et al. | | |
| 2010/0294669 A1 | 11/2010 | Abys et al. | | |
| 2017/0009350 A1* | 1/2017 | Myllymaki | .............. | C25D 5/50 |

FOREIGN PATENT DOCUMENTS

| | | | | | |
|---|---|---|---|---|---|
| CN | 105297095 | A | | 12/1978 | |
| CN | 106367785 | A | * | 2/2017 | ............. C25D 15/00 |
| CN | 106637785 | A | | 2/2017 | |
| DE | 1521025 | A1 | | 9/1969 | |
| DE | 2543082 | A | | 3/1977 | |
| DE | 2543082 | A1 | | 3/1977 | |
| DE | 3328067 | A1 | | 2/1985 | |
| GB | 1534429 | A | * | 12/1978 | ............. C25D 15/02 |
| JP | 2008248295 | A | * | 10/2008 | |
| JP | 2013124404 | A | | 6/2013 | |
| KR | 20150131346 | A | | 11/2015 | |
| WO | WO 91/14808 | | | 10/1991 | |
| WO | WO-2013074038 | A1 | * | 5/2013 | ................ B22F 7/04 |
| WO | 2014144180 | A1 | | 9/2014 | |

OTHER PUBLICATIONS

Machine translation of Chen et al. CN-106367785-A (Year: 2017).*
Carbon Waters "How to differentiate graphene" https://www.carbon-waters.com/how-to-differentiate-graphene/ (Year: 2020).*
Shen et al. Nano Lett. 2016, 16, 3585-3593 (Year: 2016).*
Kitagawa et al. JP 2008248295 A, machine translation (Year: 2008).*
International Search Report dated Jan. 17, 2020 from PCT/DE2019/100596.
Extended European Search Report of Application No. 23171227.4 Dated Jun. 21, 2023.
China National Intellectual Property Administration, Office Action of CN application 201980044369.3 Dated Feb. 24, 2023.

(Continued)

*Primary Examiner* — Wojciech Haske

(74) *Attorney, Agent, or Firm* — Lippes Mathias LLP

(57) ABSTRACT

The invention relates to a silver electrolyte for the deposition of silver layers on substrates, which comprises potassium silver cyanide, potassium cyanide with a content of at least 10 g/L, at least one grain refiner with a content of 0.2 to 10 g/L, at least one dispersant with a content of 1 to 10 g/L and at least one solid component with a content of 1 to 150 g/L, wherein the particles of the solid component have an average particle size ($d_{50}$) of 10 nm-100 µm. Furthermore, contact surfaces and methods for the deposition of such contact surfaces are shown.

13 Claims, No Drawings

(56) References Cited

OTHER PUBLICATIONS

C.E. Morstein, et al., "Graphite lubrication mechanisms under high mechanical load" Elsevier Journal. Journal homepage http://www.elsevier.com/locate/wear, 2021.

Decision of Rejection of Chinese Application No. 201980044369.3 Dated Feb. 28, 2024—English Translation also provided.

Korean 1ST Offfice Action Application No. 10-2021-7001960 Dated: Apr. 26, 2024.

* cited by examiner

SILVER ELECTROLYTE FOR DEPOSITING DISPERSION SILVER LAYERS AND CONTACT SURFACES WITH DISPERSION SILVER LAYERS

This application is a 371 of PCT Application Serial No. PCT/DE2019/100596, filed Jun. 26, 2019, which claims priority to German Patent Application Serial No. 102018005352.1, filed Jul. 5, 2018, the entirety of both application is fully incorporated herein by reference.

The invention relates to a silver electrolyte for depositing silver layers on substrates, a method for depositing a dispersion silver layer on a substrate, and contact surfaces, wherein an electrochemically deposited dispersion silver layer is disposed on a substrate. Furthermore, the invention relates to the use of contact surfaces for electrical contacts in connectors and the use of a silver electrolyte for coating a substrate by means of barrel and/or rack electroplating.

Silver is an extremely versatile material. Because of its ductility and softness, it can be processed in a variety of ways. Of all metals, silver is the best conductor of heat and electricity. This makes silver an interesting material for the electrical and electronics industry, for example for coating surfaces, especially contact surfaces. Connectors and plug contacts which have the lowest possible electrical contact resistance are used as interfaces for the transmission of high electrical currents, which is why silver coatings are often used for contact elements which are installed in such a connector and are responsible for the electrical contact when plugged in.

Silver electrolytes are used to coat substrates with silver and to produce contact surfaces. Silver electrolytes are various silver-containing solutions and dispersions which are used for the electrochemical, especially galvanic silvering of surfaces. Silver electrolyte solutions can comprise various other additives such as grain refiners, dispersants, brighteners or solid components.

For applications in the electrical and electronic sector, especially for plugs and connectors, the conductivity, contact resistance and coefficient of friction are particularly relevant. Especially with regard to the increasing electric mobility, an increased demand for silver coatings, especially electroplated silver coatings, can be expected.

In case two silver-coated surfaces are moved over each other, a high force is required for this, as insertion and extraction forces are involved. This shows the disadvantage of contacts with silver surfaces, as they have a relatively high friction coefficient, which leads to high insertion and withdrawal forces, especially with plug-in contacts. Due to the high coefficient of friction, silver surfaces are subject to wear, which greatly limits the number of possible mating cycles. In addition, there is the problem that silver surfaces tend to cold welding. However, the contact resistance of a system of two silver-coated surfaces is advantageous.

DE 10346206 A1 describes a contact surface for electrical contacts. In the silver layer shown, which was produced by galvanic processes, finely dispersed graphite particles are embedded. By incorporating graphite in the silver layer, a reduction in friction is achieved, resulting in lower insertion forces, improved corrosion protection and a longer service life of the contacts due to the increased wear protection. At the same time a good electrical contact is guaranteed.

DE 10 2008 030 988 B4 describes the electrochemical coating of a component, whereby the layer has a metallic structure and carbon nanotubes and a dry lubricant are incorporated in this layer. The installation of carbon nanotubes increases the electrical conductivity and the heat dissipation of the layer and by mixing it with other dry lubricants the layer can be optimised with regard to its wear behaviour for different applications.

DE 2543082 A1 discloses a silver electrolyte for the production of silver coatings, which also comprises graphite, brightener and wetting agent. The graphite must be kept in suspension by pumping the electrolyte containing bath during deposition.

In the state of the art, silver electrolytes are described which additionally comprise brighteners or other substances which improve deposition, such as xanthogenates, carbamates or turquoise red oil. Electrolyte solutions are also shown which require mechanical intervention to keep the solid components in suspension. Also described in the state of the art are electrolytes containing different solid components to obtain properties of deposited surfaces which are lost by complex additive systems.

A disadvantage of known silver electrolytes for the deposition of silver on surfaces is that they do not disperse the substances to be dispersed sufficiently evenly in the electrolyte, which on the one hand leads to an inhomogeneous distribution of the solid components in the deposited layers and on the other hand results in the fact that sometimes no deposition takes place at all. Also, some electrolytes are not suitable to disperse different types of solid components equally, so that pumping or stirring is necessary during the deposition, which has a negative effect on the homogeneity of the surfaces obtained. To overcome these disadvantages, complex additive systems are often used, which can have a negative effect on the deposited surfaces and also lead to increased costs.

Known electrolytes are not suitable for sufficiently dispersing further particles, especially dry lubricants, so that surfaces are obtained in which further substances such as additives are incorporated which have a negative influence on the dispersion layers produced. Among other things, this causes the inhomogeneity of known surfaces.

Another disadvantage is that up to now, combinations of solid components have often had to be used, such as carbon nanotubes and dry lubricants, in order to achieve the appropriate surface properties and to compensate for the disadvantages of the additive systems. This also leads to the fact that other substances negatively influence the homogeneity and also further increase the costs. Furthermore, additives that are supposed to improve the deposition, provide for a more complex and complicated process control and process monitoring.

Another disadvantage of known electrolytes is that the deposition temperature must be high to ensure sufficient deposition.

It is therefore the object of the invention to provide silver electrolytes which disperse solid components well and at the same time allow to dispense with complex additive systems in order to achieve a homogeneous deposition. A further object of the invention is to provide surfaces, in particular contact surfaces, which exhibit increased wear resistance and good electrical conductivity. It is also the object of the invention to provide a deposition process for the production of coated surfaces, especially contact surfaces, with improved durability.

Durability in this case means a reduction in the required insertion forces accompanied by an increase in the number of possible mating cycles, a reduction in cold welding, i.e. the welding of the soft silver layers due to micro-vibrations, and the maintenance of the best possible contact resistance over the longest possible period of time.

The object underlying the invention is solved by a silver electrolyte according to claim 1. Preferred embodiments of the silver electrolyte according to the invention are indicated in the sub-claims, which can be optionally combined with each other.

The subject matter of the invention is further a method for the deposition of a dispersion silver layer on a substrate according to claim 8. Preferred embodiments of the method according to the invention are indicated in the subclaims, which may optionally be combined with each other.

The invention further comprises a contact surface according to claim 12 below. Preferred embodiments of the contact surface according to the invention are indicated in the sub-claims, which can be optionally combined with each other.

The invention also relates to the use of the inventive contact surfaces for electrical contacts in plug connections according to the invention and the use of the dispersion silver electrolyte according to the invention for coating a substrate by means of barrel and/or rack application.

The silver electrolyte for the deposition of silver layers on substrates comprises according to invention a) Potassium silver cyanide,
b) Potassium cyanide with a minimum content of 10 g/L,
c) at least one grain refiner with a content of 0.2 to 10 g/L
d) at least one dispersant with a content of 1 to 10 g/L and
e) at least one solid component with a content of 1 to 150 g/L, where the particles of the solid component have an average particle size ($d_{50}$) of 10 nm-100 μm.

Surprisingly, it has been shown that with a silver electrolyte in the composition shown, different solid components can be homogeneously dispersed to obtain surfaces with a dispersion silver layer with increased durability and good electrical conductivity. The electrolyte according to the invention is characterised by the fact that a wide variety of dispersion silver layers can be produced with it. Depending on the type and quantity of solid components incorporated, these layers are characterised by their good contact resistance with an improved coefficient of friction or increased hardness. The durability of these layers, in terms of abrasion or rubbing through, exceeds that of simple silver layers. The electrolyte according to the invention is also particularly suitable for the use of solid components as substances to be dispersed. In addition, the electrolyte according to the invention produces silver layers with good conductivity, so that the addition of other substances such as carbon nanotubes is not necessary. Furthermore, the electrolyte according to the invention can be used both at low and high current densities. Thus, the electrolyte can be used for a wide range of applications and can, for example, be used in barrel and rack electroplating. The electrolyte is suitable for many types of electrochemical depositions.

The solid components are homogeneously dispersed in the electrolyte according to the invention. The particularly homogeneous dispersion ensures the homogeneous incorporation of the solid components in the deposited silver layers. In addition, the use of the electrolyte according to the invention reduces the incorporation of additives, which regularly has a negative influence on homogeneity.

In addition, the electrolyte is suitable for use with different solid components, so that the surface properties can be adapted to different applications. A further advantage of the electrolyte according to the invention is that the layer thickness can be varied and adapted to the respective application.

"Substituted" in the sense of the invention means that a hydrogen atom on a hydrocarbon is replaced by another atom or group of atoms.

For the purpose of the invention, "solid component" means a component which is not present in solution but is present in the electrolyte as a solid and is also referred to as finely dispersed solid component in connection with the present dispersion silver layers.

For the purposes of the invention, the mean particle size ($d_{50}$) indicates that 50% of the particles of a solid component have a diameter smaller than the value indicated. The $d_{90}$ value indicates that 90% of the particles of a solid component have a smaller diameter than the specified value.

"Grain refiner" in the sense of the invention are substances which shift the grain size of silver deposition to smaller grain sizes.

"Dry lubricants" in the sense of the invention are substances which improve the sliding properties of a surface.

"Hard materials" in the sense of the invention are materials which are characterised by their particularly high hardness.

The silver electrolyte is a solution, preferably an aqueous solution. Other solvents may also be contained in the electrolyte.

Unless otherwise stated, all contents in g/L are referred to the total volume of electrolyte in the following.

In an advantageous embodiment, the content of potassium silver cyanide in the electrolyte is at least 10 g/L, preferably at least 25 g/L, more preferably at least 40 g/L and even more preferably at least 50 g/L.

Advantageously, the content of silver in the electrolyte is at least 15 g/L, preferably at least 20 g/L, more preferably at least 25 g/L and even more preferably at least 27 g/L.

Preferably the content of silver in the electrolyte is between 1 and 100 g/L, preferably between 5 and 50 g/L and even more preferably between 10 and 30 g/L.

Preferably the content of potassium silver cyanide in the electrolyte is not more than 150 g/L, preferably not more than 125 g/L, more preferably not more than 100 g/L and even more preferably not more than 75 g/L.

The potassium cyanide content is preferably at least 20 g/L, preferably at least 50 g/L, more preferably at least 80 g/L, even more preferably at least 100 g/L, even more preferably at least 120 g/L and most preferably at least 140 g/L.

In an advantageous embodiment, the at least one grain refiner is selected from naphthalene sulphonic acid, naphthalene sulphonic acid derivatives or mixtures thereof.

The content of grain refiner is advantageous between 0.2 and 8 g/L, preferably between 0.3 and 6 g/L, more preferably between 0.4 and 5 g/L and even more preferably between 0.5 and 3 g/L.

The dispersant preferably comprises alkyl sulphates with C1-C25 alkyl radicals and preferably alkyl sulphates with C1-C20 alkyl radicals, which may be unsubstituted or optionally substituted. Preferably the dispersant comprises an alkyl sulphate with C1-C20 alkyl radicals, which may be unsubstituted or optionally substituted, and more preferably a sodium alkyl sulphate with C1-C20 alkyl radicals, which may be unsubstituted or optionally substituted. The alkyl radicals may be linear and/or branched.

Preferably the content of at least one dispersant is between 0.2 and 9 g/L, preferably between 0.3 and 8 g/L, more preferably between 0.4 and 7 g/L and even more preferably between 0.5 and 6 g/L.

The content of at least one solid component is preferably between 5 and 125 g/L, preferably between 10 and 100 g/L, more preferably between 15 and 90 g/L and even more preferably between 20 and 80 g/L.

Preferably the content of at least one solid component is at least 5 g/L, preferably at least 10 g/L, more preferably at least 15 g/L, even more preferably at least 20 g/L, even more preferably at least 30 g/L and most preferably at least 40 g/L.

In an advantageous embodiment, the particles of at least one solid component have an average particle size ($d_{50}$) of 50 nm to 75 μm, preferably 100 nm to 50 μm, more preferably 500 nm to 35 μm and even more preferably 1 μm to 20 μm. The diameters and thus also the mean particle size ($d_{50}$) of the solid components are determined by laser diffraction.

As solid components, all types of organic or inorganic particles can be considered.

Preferably the at least one solid component is a dry lubricant, a hard material or mixtures thereof, preferably a dry lubricant.

In an advantageous embodiment, the at least one solid component is selected from silicates, sulphides, carbides, nitrides, oxides, selenides, tellurides, organic and inorganic polymers and carbon modifications. For the purposes of the invention, carbon modifications in the present case include not only diamond, londsdaleite, fullerenes and graphite but also graphene, carbon nanotubes, carbon black, activated carbon, graphite fluoride, graphite oxide, graphite coated with $Al_2O_3$, non-graphitic and other forms of carbon.

According to an advantageous embodiment, the at least one solid component is selected from the group consisting of $MoS_2$, $WS_2$, $SnS_2$, $NbS_2$, $TaS_2$, graphite, graphite fluoride, graphite oxide, hexagonal boron nitride, silver niobium selenide, TiN, $Si_3N_4$, $TiB_2$, WC, TaC, $B_4C$, $Al_2O_3$, $ZrO_2$, cubic BN, diamond, $MoSe_2$, $WSe_2$, $TaSe_2$, $NbSe_2$, SiC, $Al_2O_3$ coated graphite, $Al_2O_3$ coated $MoS_2$ and $Al_2O_3$ coated $WS_2$ or mixtures thereof, preferably of $MoS_2$, $WS_2$, graphite, graphite oxide, hexagonal boron nitride or mixtures thereof, more preferably of graphite, graphite oxide, $MoS_2$, $WS_2$ or mixtures thereof and even more preferably graphite.

$Al_2O_3$ coated solid particles are produced by coating the solid particles by means of controlled hydrolysis of Al $(NO_3)_3 \cdot 9H_2O$ according to Huang & Xiong (2008) (Huang, Z.; Xiong, D. (2008): $MoS_2$ *coated with $Al_2O_3$ for Ni-$MoS_2$/$Al_2O_3$ composite coatings by pulse electrodeposition*. Surface & Coatings & Technology 202 (2008) 3208-3214).

According to an advantageous embodiment, the at least one solid component is selected from silicates, sulphides, carbides, nitrides, oxides, selenides, tellurides, organic and inorganic polymers. Preferably the at least one solid component is selected from the group consisting of $MoS_2$, $WS_2$, $SnS_2$, $NbS_2$, $TaS_2$, hexagonal boron nitride, silver niobium selenide, TiN, $Si_3N_4$, $TiB_2$, WC, TaC, $B_4C$, $Al_2O_3$, $ZrO_2$, cubic BN, $MoSe_2$, $WSe_2$, $TaSe_2$, $NbSe_2$, SiC, $Al_2O_3$ coated $MoS_2$ and $Al_2O_3$ coated $WS_2$ or mixtures thereof, preferably of $MoS_2$, $WS_2$, hexagonal boron nitride or mixtures thereof and more preferably of $MoS_2$, $WS_2$ or mixtures thereof.

According to another advantageous embodiment, at least one solid component is selected from carbon modifications. Preferably the at least one solid component is selected from the group consisting of graphite, graphite fluoride, graphite oxide, diamond, $Al_2O_3$-coated graphite or mixtures thereof, preferably graphite, graphite fluoride, graphite oxide, $Al_2O_3$-coated graphite or mixtures thereof, more preferably graphite, graphite oxide or mixtures thereof and even more preferably graphite.

Preferably the electrolyte comprises at least one more solid component. This at least one further solid component can also be selected from the above mentioned solid components.

The electrolyte can also comprise a brightener. A quantity of 1 to 1000 mg/L, preferably less than 50 mg/L, is usually used for this purpose. Examples of brighteners are phenylpropionic acid, phenylpropionic acid amide, triaminotriphenylmethane, 1-(β-aminophenyl)-3-methylpyrazole, stearamidopropyldimethyl-(β-hydroxyethyl)ammonium dihydrogen-phosphate, 1,5-diphenylcarbazide and chloralhydrate.

The silver electrolyte according to the invention can optionally comprise further additives such as stabilisers, dispersants and/or grain refiners to further improve the performance of the electrolyte and to enhance the properties of the deposited dispersion silver layer.

The above mentioned embodiments can also be combined.

A further subject matter of the invention is a process for depositing a dispersion silver layer on a substrate, comprising the steps a) providing of a silver electrolyte according to the invention,
b) introducing a substrate into the silver electrolyte, and
c) performing the deposit.

The method according to the invention comprises the deposition of a dispersion silver layer on a substrate from a silver electrolyte according to one of the above-described embodiments. The information given above about the inventive electrolyte is also valid for the method.

In the method according to the invention, all usual substrates used for the deposition of silver layers and dispersion silver layers can be used. In the method according to the invention, the substrate preferably comprises a metal or a metal alloy.

The dispersion silver layer is then deposited on the metal or metal alloy. The metal or metal alloy may, for example, comprise or consist of copper and/or iron. Other intermediate layers of other metals such as nickel or silver may also be present. Such layers have various functions such as increasing the adhesion of the dispersion silver layer to the substrate, protection against corrosion, protection against diffusion or improvement of other physical properties.

Galvanic or external currentless processes can be used as deposition methods. Examples of galvanic processes are barrel, rack or strip electroplating.

The substrate is preferably cleaned before coating, preferably degreased. The substrate can be subjected to various pretreatment steps. Copper layers, nickel layers and/or further silver layers can be deposited.

Preferably the substrate is pre-silvered before step a). Preferably the substrate is nickel-plated before pre-silvering.

According to an advantageous embodiment, the temperature when carrying out the deposition in step c) is 1° C. to 50° C., preferably 5° C. to 40° C., more preferably 5° C. to 35° C., even more preferably 10° C. to 30° C., even more preferably 15° C. to 25° C., even more preferably 17° C. to 22° C. and most preferably 20° C.

In an advantageous embodiment, the current density in step c) is from 0.03 $A/dm^2$ bis 1.2 $A/dm^2$, preferably from 0.05 $A/dm^2$ to 1.0 $A/dm^2$, more preferably from 0,075 $A/dm^2$ to 1.0 $A/dm^2$, even more preferably from 0.1 $A/dm^2$ to 0.95 $A/dm^2$ and even more preferably from 0.15 $A/dm^2$ to 0.90 $A/dm^2$.

According to an advantageous embodiment, the process is barrel and/or rack electroplating.

The duration of the deposition is to be chosen according to the desired layer thickness to be achieved and the application of, barrel and/or rack electroplating. Due to the lower current densities for barrel and rack electroplating compared to other processes, the deposition time is longer. Basically, the duration of the deposition is not limited.

Preferably the duration of the deposit in step c) at least 5 min, preferably at least 7 min, more preferably at least 9 min and even more preferably at least 11 min.

Preferably the duration of the deposit in step c) is from 5 min to 100 min, preferably from 7 min to 75 min and more preferably from 10 min bis 50 min.

Preferably step a) is carried out before step b), step b) is followed by step c).

A further subject-matter of the invention relates to a contact surface, wherein according to the invention an electrochemically deposited dispersion silver layer is arranged on a substrate, and wherein the dispersion silver layer comprises particles of at least one finely dispersed solid component with an average particle size ($d_{50}$) of 10 nm-100 μm.

The information given above about the electrolyte and the method according to the invention is also valid for the contact surface. The finely dispersed solid component can thus be selected from the solid components mentioned above. As substrates for the contact surfaces in accordance with the invention, all the above-mentioned substrates can be used.

The contact surfaces according to the invention allow only one contact partner to be equipped with a dispersion silver surface when a dry lubricant is used as the solid component. The other contact partner can consist of a conventional metal surface without solid content, especially dry lubricant content. In this way costs can be reduced. However, both contact partners can also be equipped with a dispersion silver surface.

The contact surfaces according to the invention are characterised by their advantageous wear resistance. In particular, the resistance of mating processes to wear caused by micro movements, so-called fretting, is significantly improved. Such micromovements occur, for example, in connectors in automobiles due to vibrations during operation of the vehicle. Wear due to micromovements can also occur due to temperature fluctuations.

Preferably the contact surface comprises at least one more solid component. Preferably the at least one further solid component is a dry lubricant or a hard material. Preferably the at least one further solid component selected from the solid components mentioned above for the electrolyte according to the invention, which are also valid for the contact surface.

In an advantageous embodiment, the particles of at least one finely dispersed solid component have an average particle size ($d_{50}$) of 50 nm to 75 μm, preferably 100 nm to 50 μm, more preferably 500 nm to 35 μm and even more preferably 1 μm to 20 μm. The same applies to particles of other solid constituents.

The content of at least one finely dispersed solid component in the dispersion silver layer can be varied by changing the depositing conditions. In this way, the properties of the surface can be adjusted in terms of contact resistance and wear resistance.

According to an advantageous embodiment of the contact surface, the dispersion silver layer contains the at least one finely dispersed solid component in an amount of at least 3.0 wt. %, preferably at least 3.1 wt. %, more preferably at least 3.2 wt. %, even more preferably at least 3.3 wt. % and even more preferably at least 3.5 wt. % based on the total weight of the dispersion silver layer.

Preferably the dispersion silver layer contains the at least one finely dispersed solid component in a quantity ranging from 3.0 to 30.0 wt. %, preferably from 3.1 to 25 wt. %, more preferably from 3.1 to 20 wt. %, even more preferably from 3.1 to 15 wt. %, even more preferably from 3.2 wt. % to 10 wt. % and even more preferably from 3.5 wt. % to 10 wt. % based on the total weight of the dispersion silver layer.

Preferably the at least one finely dispersed solid component selected from silicates, sulphides, carbides, nitrides, oxides, selenides, tellurides, organic and inorganic polymers and carbon modifications.

According to an advantageous embodiment of the contact surface, the at least one finely dispersed solid component is selected from silicates, sulphides, carbides, nitrides, oxides, selenides, tellurides, organic and inorganic polymers. Preferably the at least one finely dispersed solid component is selected from the group consisting of $MoS_2$, $WS_2$, $SnS_2$, $NbS_2$, $TaS_2$, hexagonal boron nitride, silver niobium selenide, TiN, $Si_3N_4$, $TiB_2$, WC, TaC, $B_4C$, $Al_2O_3$, $ZrO_2$, cubic BN, $MoSe_2$, $WSe_2$, $TaSe_2$, $NbSe_2$, SiC, $Al_2O_3$ coated $MoS_2$ and $Al_2O_3$ coated $WS_2$ or mixtures thereof, preferably of $MoS_2$, $WS_2$, hexagonal boron nitride or mixtures thereof and more preferably of $MoS_2$, $WS_2$ or mixtures thereof.

According to another advantageous embodiment of the contact surface, the at least one finely dispersed solid component is selected from carbon modifications. Preferably the at least one finely dispersed solid component is selected from the group consisting of graphite, graphite fluoride, graphite oxide, diamond, $Al_2O_3$ coated graphite or mixtures thereof, preferably graphite, graphite fluoride, graphite oxide, $Al_2O_3$ coated graphite or mixtures thereof, more preferably graphite, graphite oxide or mixtures thereof and even more preferably graphite.

According to an advantageous embodiment, the at least one finely dispersed solid component is selected from the group consisting of $MoS_2$, $WS_2$, $SnS_2$, graphite, graphite oxide, graphite fluoride, hexagonal boron nitride, silver niobium selenide, SiC, $Al_2O_3$ coated graphite, $Al_2O_3$ coated $MoS_2$ and $Al_2O_3$ coated $WS_2$ or mixtures thereof, preferably $MoS_2$, $WS_2$, graphite and hexagonal boron nitride or mixtures thereof.

In a further advantageous embodiment of the contact surface, the at least one finely dispersed solid component is selected from the group consisting of graphite, $MoS_2$, $WS_2$ or mixtures thereof, preferably graphite, and the dispersion silver layer comprises the at least one finely dispersed solid component in an amount of at least 3.0 wt. %, preferably at least 3.1 wt. %, more preferably at least 3.2 wt. %, even more preferably at least 3.3 wt. % and even more preferably at least 3.5 wt. % based on the total weight of the dispersion silver layer.

In another advantageous embodiment of the contact surface, the dispersion silver layer has a coefficient of friction μ at 0.3 N after 100 cycles of less than 1.4, preferably less than 1.2, more preferably less than 1.0, even more preferably less than 0.8, even more preferably less than 0.6 and even more preferably of 0.4.

In another advantageous embodiment of the contact surface, the electrical contact resistance at 1.0 N after 100 cycles is less than 1.0 mΩ, preferably less than 0.8 mΩ, more preferably less than 0.75 mΩ, even more preferably less than 0.7 mΩ and even more preferably less than 0.65 mΩ.

In another advantageous embodiment of the contact surface, the dispersion silver layer has a coefficient of friction p at 1.0 N after 100 cycles of less than 1.0, preferably less than 0.8, more preferably less than 0.6, even more preferably less than 0.5 and even more preferably less than 0.45.

Preferably, the thickness of the deposited dispersion silver layer is between 0.5 μm to 200 μm, preferably 1 μm to 100 μm, especially preferably 1.1 μm to 25 μm.

Advantageously, the contact surface is a microrough surface. The micro-roughness has a positive effect on the tribological and electrical properties.

Preferably, the contact surface has a micro-roughness, described hereinafter by the average roughness Ra, of at least 0.05 μm, preferably at least 0.1 μm, more preferably at least 0.2 μm and even more preferably at least 0.3 μm.

Preferably, the contact surface has a micro-roughness, described hereinafter by the average roughness Ra, in the range of 0.05 μm to 5 μm, preferably from 0.1 μm to 4 μm, more preferably from 0.2 μm to 3 μm and even more preferably from 0.3 μm to 2.5 μm.

In another advantageous embodiment, the contact surfaces have a fretting life according to Song at 1.0 N of more than 7500 cycles, preferably more than 10,000 cycles, more preferably more than 15,000 cycles, even more preferably more than 20,000 cycles and even more preferably more than 25,000 cycles.

The aforementioned contact surfaces can be produced by means of the above described method according to the invention. Thus the invention also comprises a contact surface obtainable by the method according to the invention, wherein an electrochemically deposited dispersion silver layer is arranged on a substrate, and wherein the dispersion silver layer comprises particles of at least one finely dispersed solid component with an average particle size ($d_{50}$) of 10 nm-100 μm.

The above described information on the electrolyte according to the invention, the method according to the invention and the contact surfaces according to the invention are also valid for the contact surfaces obtained by means of the method according to the invention. The finely dispersed solid component can thus be selected from the solid components mentioned above. As substrates for the contact surfaces in accordance with the invention, all the above-mentioned substrates can be used.

A further subject-matter of the invention relates to the use of the contact surface for electrical contacts in plug connections.

A further subject-matter of the invention concerns the use of the dispersion silver electrolyte according to the invention for coating a substrate by means of rack and/or barrel application.

Further advantages of the invention result from the following description of preferred embodiment examples, which are however in no way to be understood as restrictive. All embodiments of the invention can be combined within the scope of the invention.

EMBODIMENTS

Materials

Brass sheets (material: CuZn39Pb3) from Metaq GmbH with the dimensions 75 mm×17 mm×1 mm were used for the tests. The used bronze balls (material: CuSn6) from the company KUGELPOMPEL HSI-Solutions GmbH had a diameter of 3 mm.

KCN was purchased from Bücherl and $K[Ag(CN)_2]$ was purchased from Umicore.

ELFIT 73, a bright silver electrolyte based on KCN/potassium silver cyanide, SLOTOSIL BS 1591, a silver electrolyte based on KCN/potassium silver cyanide, SLOTOSIL BS 1592, a brightener, and ALTIX, a bright silver electrolyte based on KCN/potassium silver cyanide for the deposition of hard silver layers, were developed by Dr.-Ing. Max Schlötter GmbH & Co. KG. CUPRUM 11, a brightener, CUPRUM 12, a wetting agent, and the anti-tarnish concentrate AG 111 were also purchased from Dr.-Ing. Max Schlötter GmbH & Co. KG.

SLOTOSIL SG 1911 and SLOTOSIL SG 1912 are additives for silver electrolytes based on KCN/potassium silver cyanide for the dispersion separation of the company Dr.-Ing. Max Schlötter GmbH & Co. KG. SLOTOSIL SG 1911 comprises a naphthalene sulphonic acid derivative as grain refining additive. SLOTOSIL SG 1912 comprises an alkyl sulfate as dispersion stabilizing additive.

The graphites used come from Graphit Kropfmühl AG. The individual graphite powders have different average particle sizes from $d_{50}$=3 μm (Graphite UF 1) to $d_{50}$=11.5 μm (Graphite EDM-L 98) and also vary in conductivity.

The sulphide particles used ($MoS_2$, $WS_2$) come from Tribotecc GmbH and have an average particle size of $d_{50}$=11 μm and $d_{90}$=23 μm ($MoS_2$ MOSXF) or $d_{50}$=3 μm and $d_{90}$=6 μm ($WS_2$ WS 2).

Measurement Methods

Wear Test

Coated bronze balls are rubbed over coated brass plates on the wear test stand. A weight force of 0.3 N or 1.0 N was applied to the ball. This rubs with the selected force over a distance of 3 mm with a frequency of 1 Hz over the coated brass sheet. This is repeated for 100 cycles. During the test, the frictional force is measured with a load cell U9C (HBM) and calculated with the normal force to the unitless friction coefficient μ. In addition, the contact resistance at the contact between the coated brass sheet and the ball is measured after each cycle. The contact resistance is measured using the four-wire method with a 2750/E digital multimeter (Keithley company).

Determination of Fretting Life by Song

The same test equipment is used for this test as for the regular wear test. The friction path is 50 μm long, the frequency and the normal force remain as described for the wear test at 1 Hz and a normal force of 0.3 N to 1.0 N. The comparison criterion is the life span I according to Song, which is defined as $R_{initial}$+5 mΩ and is based on common test standards (Song, J.; Wang, L.; Koch, C. (2013): Correlation between friction and wear properties and life span of surface protection layers of electrical contacts. In: Song, J. (eds.): Electrical and optical connectivity 2013. Proceedings of the GMM conference. 4th Symposium Connectors). The structure of the test apparatus is described in Song. et al. The target is 50,000 cycles.

Measurement of Micro Roughness (as Centre Roughness Ra)

The microroughness (as mean roughness Ra) was measured by means of an optical measuring method with a confocal microscope μsurf explorer (Manufacturer: nanofocus).

Determination of Solid Content

The solid content (in weight %) was determined by X-ray diffraction. For this purpose, a D8 Advance DaVinci Design X-ray diffractometer (Bruker company) with Lynxeye solid state detector using Cu Kα radiation was used to take X-ray diffractograms of the deposited thin films. The corresponding diffractograms were evaluated by Rietveld refinement with the program DIFFRAC$^{plus}$ TOPAS Version 4.2 (Bruker company).

Determination of the Diameter of the Solid Components ($d_{50}$, $d_{90}$)

The diameters of the particles of the solid components, the mean particle size $d_{50}$ and the $d_{90}$ values were determined by laser diffraction with a Helos instrument from Sympatec.

Coating of Brass Sheets and Bronze Balls

Galvanisation

Samples were coated with dispersion silver layers and pure silver layers to obtain contact surfaces. Brass sheets and bronze balls were coated for the wear, contact resistance and fretting life tests. The specimens were first copper-plated and then the parts were coated with a pure silver layer (comparative examples, VB) or a dispersion silver layer (inventive examples, EB).

Between each step, the samples were thoroughly rinsed with water.

The galvanisation of the brass sheets and bronze balls included the following steps:

1. and 2. step: degreasing of the substrates according to known methods; first alkaline degreasing step at 60° C. for 1 min with ultrasonic support. Second alkaline electrolytic degreasing step at room temperature (25° C.) for a treatment time of 2 to 3 min.
3. step: Etching of copper with bath of sulphuric acid, complexing agent-free copper activation. The activation is applied at room temperature (25° C.) for 0.5 min.
4. step: Treatment with bright copper bath, which is a cyanide electrolyte to deposit bright surfaces. The electrolyte, consisting of 10 g/l KOH, 115 g/l KCN, 64 g/l CuCN and 1.5 ml/l brightener CUPRUM 11; 2.5 ml/l base additive CUPRUM 12 was operated at 60° C. The electrolyte was used with 2 A/$dm^2$ for the rack application. For the barrel application with 1.25 A/$dm^2$.
5. step: The pre-silvering was carried out in a pre-silvering bath with a cyanide electrolyte with low silver content (120 g/l KCN; 3.7 g/l $K[Ag(CN)_2]$). The pre-silver plating was operated at room temperature (25° C.). As cathodic current density 2 A/$dm^2$ was chosen.
6. step: Deposition of the pure silver layer (comparative examples, VB) or the dispersion silver layers (inventive examples, EB).

The brass sheets were hung on a frame for coating. Only the brackets for the brass sheets were conductive on the frame.

The bronze balls were coated as barrel plating. The balls were placed in a sieve basket with a mesh size of 0.8 mm with silver-plated steel balls as filling material and attached to an electroplating unit. An electroplating unit with pump was used to deposit the dispersion layers.

The electrolytes used can be taken from table 1.

Pure Silver Coating (VB1, VB2, VB3)

The brass plates were moved with a stroke movement of 0.7 m/min. The deposition took place at a current density of 0.37 A/$dm^2$ (0.1 A/sheet) for 22 min. The balls were moved in the drum at 12 rpm and the silver layer was deposited at a current density of 0.25 A/$dm^2$ (1.85 A for 70 balls with about 300 g of filler material) for 25 min.

Coating with Dispersion Silver Layers (EB1 Bis EB6)

The brass plates were moved with a stroke movement of 0.7 m/min, the dispersing unit (ULTRA-TURRAX T 25, company IKA-Werke GmbH & Co. KG) was set to 5,000 rpm for the depositions of the examples EB1 to EB4 and to 10,000 rpm for the depositions of the examples EB5 to EB6. The deposition took place at a current density of 0.85 A/$dm^2$ (0.23 A/sheet metal) for EB1 to EB4 each for 22 min, for EB5 and EB6 each for 20 min.

The balls were moved in the drum at 2 rpm and the silver layer was deposited at a current density of 0.5 A/$dm^2$ (4.1 A for 70 balls with approx. 300 g filler material) for 13 min.

7. step: Antitarnish aftertreatment; The antitarnish, 160 mL/L Antitarnish Concentrate AG 111, was applied at 50° C. and pH 5.3. The coated test specimens were immersed in the anti-tarnish for 2 min. Afterwards they were rinsed with deionised water and dried.

Table 1 lists the compositions of pure silver baths and dispersion silver baths.

TABLE 1

Compositions pure silver baths and dispersion silver baths

| | | VB1 | VB2 | VB3 | EB1 | EB2 | EB3 | EB4 | EB5 | EB6 |
|---|---|---|---|---|---|---|---|---|---|---|
| KCN | g/L | 154 | 130 | 154 | 154 | 154 | 154 | 154 | 154 | 154 |
| $K[Ag(CN)_2]$ | g/L | 56 | 75 | 56 | 56 | 56 | 56 | 56 | 56 | 56 |
| ELFIT 73 Grund | mL/L | 30 | | | | | | | | |
| ELFIT 73 Glanz | mL/L | 0.2 | | | | | | | | |
| ALTIX | mL/L | | 30 | | | | | | | |
| KOH | g/L | | 5 | | | | | | | |
| SLOTOSIL BS 1591 | mL/L | | | 2 | | | | | | |
| SLOTOSIL BS 1592 | mL/L | | | 25 | | | | | | |
| SLOTOSIL SG 1911 | mL/L | | | | 20 | 20 | 20 | 20 | 20 | 20 |
| SLOTOSIL SG 1912 | mL/L | | | | 20 | 20 | 20 | 20 | 20 | 20 |
| Graphit UF1 ($d_{50}$ =3 μm) | g/L | | | | 70 | | | | | |
| Graphit UF2 (4.75 μm) | g/L | | | | | 70 | | | | |
| Graphit Cond5 ($d_{50}$ = 6.25 μm) | g/L | | | | | | 70 | | | |
| Graphit EDM-L98 (11.5 μm) | g/L | | | | | | | 70 | | |
| $MoS_2$ (11 μm) | g/L | | | | | | | | 16 | |
| $WS_2$ (3 μm) | g/L | | | | | | | | | 20 |

Table 2 shows the results of the wear and fretting tests. In addition, the contact resistances of the surfaces after 100 cycles are shown. The micro-roughness of the surfaces was also determined in the form of the average roughness value, Ra. The graphite contents of the graphite-containing dispersion silver layers were also measured.

TABLE 2

| | Measured values | | | | | | | | |
|---|---|---|---|---|---|---|---|---|---|
| | VB1 | VB2 | VB3 | EB1 | EB2 | EB3 | EB4 | EB5 | EB6 |
| coefficient of friction μ, 0.3N (after 100 cycles) | 1.83 | 1.79 | 1.74 | 0.20 | 0.29 | 0.25 | 0.22 | 0.24 | 0.27 |
| Contact resistance (mΩ), 0.3 N (after 100 cycles) | 1.26 | 2.96 | 1.12 | 0.97 | 0.79 | 0.81 | 0.94 | 0.68 | 0.79 |
| coefficient of friction μ, 1.0N (after 100 cycles) | 1.01 | 1.16 | 1.22 | 0.20 | 0.22 | 0.23 | 0.22 | 0.22 | 0.26 |
| Contact resistance (mΩ), 1.0N (after 100 cycles) | 0.92 | 1.80 | 0.83 | 0.75 | 0.71 | 0.67 | 0.76 | 0.51 | 0.68 |
| Ra (sheet metal) (μm) | 0.02 | 0.02 | 0.03 | 1.47 | 1.19 | 0.94 | 0.21 | 2.44 | 3.22 |
| Fretting life according to Song at 1.0N (cycles) | 3968 | 9213 | 35200 | 50000 | 25741 | 50000 | 42283 | n.b. | 45383 |
| Graphite or metal sulphide particle content Front side sheet metal (weight %) | 0 | 0 | 0 | 3.39 | 3.91 | 6.54 | 9.40 | n.b. | 3.02 |

n.b.: not determined

The dispersion silver layers with graphite, EB1 to EB4, or the disulphides, EB5 and EB6, are a major advance. In the wear test with 0.3 N and 100 cycles, these layers remain below a coefficient of friction of 0.4, while the pure silver layers according to examples VB1 to VB3 have at least a much higher coefficient of friction. The electrical contact resistance of the dispersion silver layers remains below 1.0 mΩ while the contact resistance of the pure silver layers is higher, with the VB2 even above 2.5 mΩ.

The wear test at 1.0 N and 100 cycles shows that the dispersion silver layers with graphite and the disulphides still have very low coefficients of friction after the 100 cycles. The conductivity of these dispersion silver layers is even slightly higher than that of pure silver layers.

The fretting tests at 1.0 N show that the graphite silver layers according to inventive examples 1, 3, 4 and 6 (EB1, EB 3, EB4 and EB 6) are superior to the pure silver layers of the comparison examples 1 to 3 (VB1 to VB3).

It can be seen that the dispersion silver layers have consistently good properties compared to the examples EB1 to EB6 according to the invention and in particular the combination of low friction coefficients, low contact resistance and high resistance to fertilisation. None of the comparative examples show the combination of advantageous properties.

Furthermore, it is shown that contact surfaces with a graphite or metal sulphide particle content, i.e. solid component content of more than 3.0 weight % based on the total weight of the dispersion silver layer, show very good results.

The invention claimed is:

1. A contact surface, wherein an electrochemically deposited dispersion silver layer is arranged on a substrate,
- wherein the dispersion silver layer comprises particles of at least one finely dispersed solid component with a mean particle size ($d_{50}$) of 1 μm-20 μm;
- wherein the dispersion silver layer comprises the at least one finely dispersed solid component in a content of 3.3 to 10 wt %, based on the total weight of the dispersion silver layer; and
- wherein the silver dispersion layer has a coefficient of friction p at 0.3 N after 100 cycles of less than 1.4 and a fretting life at 1.0 N of more than 7500 cycles;
- wherein the at least one finely dispersed solid component is selected from the group consisting of graphite, graphite fluoride, graphite oxide, diamond, $Al_2O_3$ coated graphite and mixtures thereof.

2. The contact surface according to claim 1, wherein
- the electrical contact resistance at 1.0 N after 100 cycles is less than 1.0 mΩ; and/or
- the dispersion silver layer has a coefficient of friction p at 1.0 N after 100 cycles of less than 1.0.

3. A plug connection comprising an electrical contact having the contact surface according to claim 1.

4. The contact surface according to claim 1, wherein the at least one finely dispersed solid component is graphite.

5. The contact surface according to claim 1, wherein the content of the at least one finely dispersed solid component is 3.5 to 10 wt %, based on the total weight of the dispersion silver layer.

6. The contact surface of claim 1, wherein the particles of the at least one finely dispersed solid component have an average particle size ($d_{50}$) of 3 μm.

7. The contact surface of claim 1, wherein the silver dispersion layer has a fretting life at 1.0 N of more than 10,000 cycles.

8. The contact surface of claim 1, wherein the silver dispersion layer has a fretting life at 1.0 N of more than 20,000 cycles.

9. The contact surface of claim 1, wherein the contact surface has a micro-roughness of 0.05 μm to 5 μm.

10. The contact surface of claim 1, wherein the contact surface has a micro-roughness of 0.3 μm to 2.5 μm.

11. A contact surface, wherein an electrochemically deposited dispersion silver layer is arranged on a substrate,
- wherein the dispersion silver layer comprises particles of at least one finely dispersed solid component with a mean particle size ($d_{50}$) of 1 μm-20 μm;
- wherein the dispersion silver layer comprises the at least one finely dispersed solid component in a content of 3.3 to 10 wt %, based on the total weight of the dispersion silver layer;
- wherein the silver dispersion layer has a coefficient of friction p at 0.3 N after 100 cycles of less than 1.4 and an electrical contact resistance at 1.0 N after 100 cycles of below 1.0 mΩ; and
- wherein the at least one finely dispersed solid component is selected from the group consisting of $WS_2$, $SnS_2$, $NbS_2$, $TaS_2$, hexagonal boron nitride, silver niobium selenide, TiN, $Si_3N_4$, $TiB_2$, WC, TaC, $B_4C$, $Al_2O_3$, $ZrO_2$, cubic BN, $MoSe_2$, $WSe_2$, $TaSe_2$, $NbSe_2$, SiC, and $Al_2O_3$ coated $WS_2$ and mixtures thereof.

12. The contact surface according to claim 11, wherein the at least one finely dispersed solid component is selected from the group consisting of $WS_2$, hexagonal boron nitride and mixtures thereof.

13. A contact surface, wherein an electrochemically deposited dispersion silver layer directly contacts a substrate;

wherein the dispersion silver layer comprises particles of one finely dispersed solid component with a mean particle size ($d_{50}$) of 1 μm-20 μm;

wherein the one finely dispersed solid component comprises $WS_2$;

wherein the dispersion silver layer comprises the one finely dispersed solid component in a content of 3.3 to 10 wt %, based on the total weight of the dispersion silver layer; and wherein the silver dispersion layer has a coefficient of friction p at 0.3 N after 100 cycles of less than 1.4 and an electrical contact resistance at 1.0 N after 100 cycles of below 1.0 mΩ.

* * * * *